(12) United States Patent
Pan

(10) Patent No.: US 10,302,991 B2
(45) Date of Patent: May 28, 2019

(54) CIRCULAR POLARIZER, LIQUID CRYSTAL DISPLAY AND ELECTRONIC DEVICE

(71) Applicant: Wuhan China Star Optoelectronics Technology Co., Ltd., Wuhan, Hubei (CN)

(72) Inventor: Biao Pan, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 218 days.

(21) Appl. No.: 15/322,505

(22) PCT Filed: Nov. 23, 2016

(86) PCT No.: PCT/CN2016/106916
§ 371 (c)(1),
(2) Date: Dec. 28, 2016

(87) PCT Pub. No.: WO2018/064855
PCT Pub. Date: Apr. 12, 2018

(65) Prior Publication Data
US 2018/0217441 A1   Aug. 2, 2018

(30) Foreign Application Priority Data
Oct. 8, 2016 (CN) .......................... 2016 1 0877431

(51) Int. Cl.
*G02F 1/1335* (2006.01)
*G02B 5/30* (2006.01)
(Continued)

(52) U.S. Cl.
CPC ....... *G02F 1/133528* (2013.01); *G02B 5/201* (2013.01); *G02B 5/3083* (2013.01);
(Continued)

(58) Field of Classification Search
CPC ......... G02F 2001/133638; G02F 2001/133631
See application file for complete search history.

(56) References Cited

U.S. PATENT DOCUMENTS

2005/0142464 A1* 6/2005 Moriya .................. G02B 5/201
430/7
2011/0273643 A1* 11/2011 Arai .................. G02F 1/133528
349/64

FOREIGN PATENT DOCUMENTS

CN        1749831 A    3/2006
CN      101271869 A    9/2008
(Continued)

*Primary Examiner* — Phu Vu
(74) *Attorney, Agent, or Firm* — Andrew C. Cheng

(57) ABSTRACT

The present invention provides a circular polarizer, wherein the circular polarizer comprises a ¼ wave plate and a first linear polarization plate which stack up, and the ¼ wave plate comprises a plurality of hump regions, and each of the hump regions comprises a first hump, a second hump and a third hump which are sequentially aligned, and the first hump, the second hump and the third hump respectively are employed to act to allow red light, green light and blue light penetrating, and a thickness of the first hump is dR, and a thickness of the second hump is dG and a thickness of the third hump is dB, and then $dR=\lambda R/4\Delta nR$, $dG=\lambda G/4\Delta nG$, $dB=\lambda B/4\Delta nB$; wherein $\lambda R$, $\lambda G$, $\lambda B$ respectively are wavelengths of the red, green and blue light, and $\Delta nR$, $\Delta nG$, $4\Delta nB$ respectively are birefringences of the red, green and blue light in the ¼ wave plate.

17 Claims, 2 Drawing Sheets

(51) Int. Cl.
*G02B 5/20* (2006.01)
*G02B 27/26* (2006.01)
(52) U.S. Cl.
CPC .. *G02B 27/26* (2013.01); *G02F 2001/133541* (2013.01); *G02F 2201/50* (2013.01)

(56) References Cited

FOREIGN PATENT DOCUMENTS

| | | |
|---|---|---|
| CN | 101825244 A | 9/2010 |
| CN | 101866076 A | 10/2010 |
| CN | 104412133 A | 3/2015 |

\* cited by examiner

CIRCULAR POLARIZER, LIQUID CRYSTAL DISPLAY AND ELECTRONIC DEVICE

CROSS REFERENCE

This application claims the priority of Chinese Patent Application No. 201610877431.5, entitled "Circular polarizer, liquid crystal display and electronic device", filed on Oct. 8, 2016, the disclosure of which is incorporated herein by reference in its entirety.

FIELD OF THE INVENTION

The present invention relates to a display technology field, and more particularly to a circular polarizer, a liquid crystal display and an electronic device.

BACKGROUND OF THE INVENTION

Most of the present Liquid Crystal Displays (LCD) are the backlight type, which comprises a liquid crystal panel and a backlight module. The backlight module provides light source for the liquid crystal display panel for normally showing images. For making the outgoing light of the liquid crystal panel be the circularly polarized light, generally, the circular polarizers are respectively adhered on the upper surface and the lower surface of the liquid crystal panel.

In prior art, the circular polarizer can be obtained by stacking up one layer of ¼ wave plate on the linear polarization plate. The phase delay generates when the outgoing circularly polarized light passed through the ¼ wave plate. The optical efficiency $\Delta n \times d$ of the ¼ wave plate satisfies: as $\Delta n \times d = \lambda/4$ (wherein d is the thickness of the ¼ wave plate, and $\Delta n$ is the birefringence of the ¼ wave plate, and $\lambda$ is the incident light wavelength); the outgoing light of the liquid crystal panel is the circularly polarized light. Because the change of $\Delta n$ and the change of $\lambda$ have no proportionate relationship, the visible lights of various wavelengths will not be circularly polarized light after passing through the ¼ wave plate, which will result in the issue of large view angle color washout.

SUMMARY OF THE INVENTION

An objective of the present invention is to provide a circular polarizer and a liquid crystal display, which can improve the color washout issues of various colors to promote the display result.

Another objective of the present invention is to provide an electronic device utilizing the aforesaid liquid crystal display.

For realizing the aforesaid objective, the technical solution provided by the embodiments of the present invention is:

The present invention provides a circular polarizer, wherein the circular polarizer comprises a ¼ wave plate and a first linear polarization plate which stack up, and the ¼ wave plate comprises a plurality of hump regions, and each of the hump regions comprises a first hump, a second hump and a third hump which are sequentially aligned, and the first hump, the second hump and the third hump respectively are employed to act to allow red light, green light and blue light penetrating, and a thickness of the first hump is dR, and a thickness of the second hump is dG and a thickness of the third hump is dB, and then $dR=\lambda R/4\Delta nR$, $dG=\lambda G/4\Delta nG$, $dB=\lambda B/4\Delta nB$; wherein $\lambda R$, $\lambda G$, $\lambda B$ respectively are wavelengths of the red light, the green light and the blue light, and $\Delta nR$, $\Delta nG$, $4\Delta nB$ respectively are birefringences of the red light, the green light and the blue light in the ¼ wave plate.

A side of the first linear polarization plate close to the ¼ wave plate is configured with a boss abutting with the first hump, the second hump and the third hump.

The circular polarizer further comprises an upper protective layer and a lower protective layer, and the upper protective layer, the ¼ wave plate, the first linear polarization plate and the lower protective layer stack up in sequence, and a side of the upper protective layer close to the ¼ wave plate is configured with a boss abutting with the first hump, the second hump and the third hump.

The upper protective layer is a glass substrate, and the boss and the glass substrate are integrally formed.

The circular polarizer further comprises an upper protective layer, a lower protective layer, an adhesive layer and a separation layer, and the upper protective layer, the ¼ wave plate, the first linear polarization plate, the lower protective layer, the adhesive layer and the separation layer stack up in sequence.

The present invention further provides a liquid crystal display, wherein the liquid crystal display comprises a backlight module, a liquid crystal panel and a circular polarizer, and the circular polarizer comprises a ¼ wave plate and a first linear polarization plate which stack up, and the ¼ wave plate comprises a plurality of hump regions, and each of the hump regions comprises a first hump, a second hump and a third hump which are sequentially aligned, and the first hump, the second hump and the third hump respectively are employed to act to allow red light, green light and blue light penetrating, and a thickness of the first hump is dR, and a thickness of the second hump is dG and a thickness of the third hump is dB, and then $dR=\lambda R/4\Delta nR$, $dG=\lambda G/4\Delta nG$, $dB=\lambda B/4\Delta nB$; wherein $\lambda R$, $\lambda G$, $\lambda B$ respectively are wavelengths of the red light, the green light and the blue light, and $\Delta nR$, $\Delta nG$, $4\Delta nB$ respectively are birefringences of the red light, the green light and the blue light in the ¼ wave plate, and the backlight module and the liquid crystal display panel stack up, and the circular polarizer is adhered at a side of the liquid crystal display panel away from the backlight module, and the liquid crystal display panel comprises a red sub pixel, a green sub pixel and a blue sub pixel, and the red sub pixel, the green sub pixel and the blue sub pixel respectively correspond to the first hump, the second hump and the third hump.

The liquid crystal panel comprises a liquid crystal cell and a second linear polarization plate, and the second linear polarization plate is adhered to a lower surface of the liquid crystal cell, and the circular polarizer is adhered to an upper surface of the liquid crystal cell.

An included angle of optic axes of the first linear polarization plate and the second linear polarization plate is 90 degrees.

The backlight module is a direct light type backlight module or a side light type backlight module.

A side of the first linear polarization plate close to the ¼ wave plate is configured with a boss abutting with the first hump, the second hump and the third hump.

The circular polarizer further comprises an upper protective layer and a lower protective layer, and the upper protective layer, the ¼ wave plate, the first linear polarization plate and the lower protective layer stack up in sequence, and a side of the upper protective layer close to the ¼ wave plate is configured with a boss abutting with the first hump, the second hump and the third hump.

The upper protective layer is a glass substrate, and the boss and the glass substrate are integrally formed.

The circular polarizer further comprises an upper protective layer, a lower protective layer, an adhesive layer and a separation layer, and the upper protective layer, the ¼ wave plate, the first linear polarization plate, the lower protective layer, the adhesive layer and the separation layer stack up in sequence.

The present invention provides an electronic device, wherein the electronic device comprises a liquid crystal display, and the liquid crystal display comprises a backlight module, a liquid crystal panel and a circular polarizer, and the circular polarizer comprises a ¼ wave plate and a first linear polarization plate which stack up, and the ¼ wave plate comprises a plurality of hump regions, and each of the hump regions comprises a first hump, a second hump and a third hump which are sequentially aligned, and the first hump, the second hump and the third hump respectively are employed to act to allow red light, green light and blue light penetrating, and a thickness of the first hump is dR, and a thickness of the second hump is dG and a thickness of the third hump is dB, and then dR=λR/4ΔnR, dG=λG/4ΔnG, dB=λB/4ΔnB; wherein λR, λG, λB respectively are wavelengths of the red light, the green light and the blue light, and ΔnR, ΔnG, 4ΔnB respectively are birefringences of the red light, the green light and the blue light in the ¼ wave plate, and the backlight module and the liquid crystal display panel stack up, and the circular polarizer is adhered at a side of the liquid crystal display panel away from the backlight module, and the liquid crystal display panel comprises a red sub pixel, a green sub pixel and a blue sub pixel, and the red sub pixel, the green sub pixel and the blue sub pixel respectively correspond to the first hump, the second hump and the third hump.

The liquid crystal panel comprises a liquid crystal cell and a second linear polarization plate, and the second linear polarization plate is adhered to a lower surface of the liquid crystal cell, and the circular polarizer is adhered to an upper surface of the liquid crystal cell.

An included angle of optic axes of the first linear polarization plate and the second linear polarization plate is 90 degrees.

The backlight module is a direct light type backlight module or a side light type backlight module.

A side of the first linear polarization plate close to the ¼ wave plate is configured with a boss abutting with the first hump, the second hump and the third hump.

The circular polarizer further comprises an upper protective layer and a lower protective layer, and the upper protective layer, the ¼ wave plate, the first linear polarization plate and the lower protective layer stack up in sequence, and a side of the upper protective layer close to the ¼ wave plate is configured with a boss abutting with the first hump, the second hump and the third hump.

The upper protective layer is a glass substrate, and the boss and the glass substrate are integrally formed.

The embodiments of the present invention have advantages or benefits:

The circular polarizer of the present invention is formed by stacking up the first linear polarization plate and the ¼ wave plate. The first hump, the second hump and the third hump, which correspond to the red light, the green light and the blue light one by one, are configured on the ¼ wave plate, and a thickness dR of the first hump satisfies: dR=λR/4ΔnR; a thickness dG of the second hump satisfies: dG=λG/4ΔnG; a thickness dB of the third hump satisfies: B=λB/4ΔnB; thus, all the lights of various colors passing through the circular polarizer form the circularly polarized lights, which can effectively improve the large view angle color washout of various colors to promote the display result. The liquid crystal display and the electronic device provided by the present invention can improve the large view angle color washout of various colors to promote the display result.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
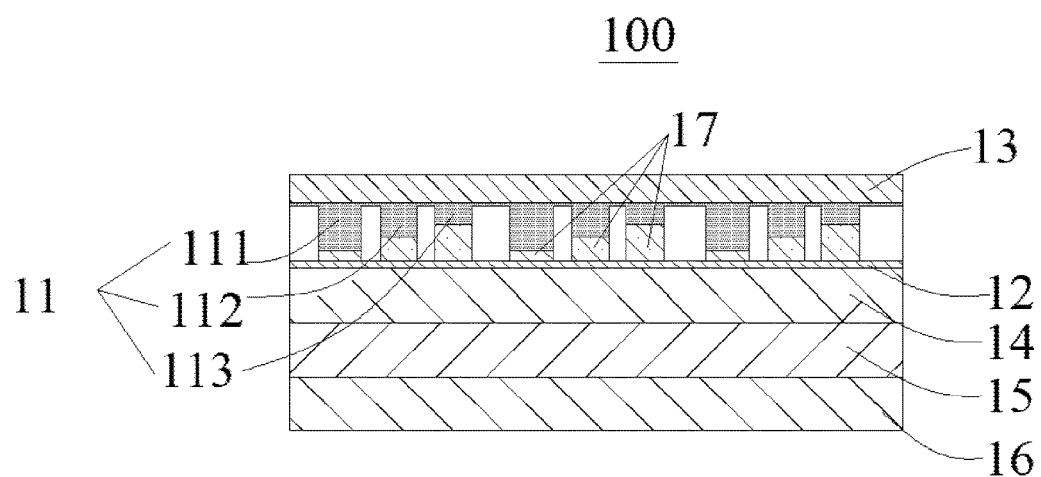
FIG. 1 is a structure diagram of a circular polarizer provided by one embodiment of the present invention.

Please refer to FIG. 1. FIG. 1 is a structure diagram of a circular polarizer provided by one embodiment of the present invention. The circular polarizer 100 mainly comprises: a ¼ wave plate 11 and a first linear polarization plate 12 which stack up. The ¼ wave plate 11 comprises a plurality of hump regions (not indicated with numbers). Each of the hump regions corresponds to one pixel on a color film substrate on a liquid crystal cell. Each of the hump regions comprises a first hump 111, a second hump 112 and a third hump 113 which are sequentially aligned, and the first hump 111 corresponds to the red sub pixel on the color film substrate of the liquid crystal panel and is employed to allow red light penetrating. The second hump 112 corresponds to the green sub pixel on the color film substrate of the liquid crystal panel and is employed to allow green light penetrating. The third hump 113 corresponds to the blue sub pixel on the color film substrate of the liquid crystal panel and is employed to allow blue light penetrating. Thicknesses (i.e. lengths perpendicular with a surface of the ¼ wave plate 11) of the first hump 111, the second hump 112 and the third hump 113 are different from one another. The following relationships are satisfied:

a thickness $dR$ of the first hump satisfies: $dR=\lambda R/4\Delta nR$;

a thickness $dG$ of the second hump satisfies: $dG=\lambda G/4\Delta nG$;

a thickness $dB$ of the third hump satisfies: $B=\lambda B/4\Delta nB$;

wherein λR, λG, λB respectively are wavelengths of the red light, the green light and the blue light, and ΔnR, ΔnG, 4ΔnB respectively are birefringences of the red light, the green light and the blue light in the ¼ wave plate.

It can be understood that as the aforesaid relationship is satisfied, the phase difference of the vibration after the red light, the green light and the blue light pass through the circular polarizer is just 90°, and the red light, the green light and the blue light form circularly polarized lights. Then, it can eliminate the large view angle color washout issue and promote the display result.

The circular polarizer of the present invention is formed by stacking up the first linear polarization plate and the ¼ wave plate. The first hump, the second hump and the third hump, which correspond to the red light, the green light and the blue light one by one, are configured on the ¼ wave plate, and a thickness dR of the first hump satisfies: dR=λR/4ΔnR; a thickness dG of the second hump satisfies: dG=λG/4ΔnG; a thickness dB of the third hump satisfies: B=λB/4ΔnB; thus, all the lights of various colors passing through the circular polarizer form the circularly polarized lights, which can effectively improve the large view angle color washout of various colors to improve the display result.

Please continue to refer to FIG. 1. In one specific embodiment of the present invention, the circular polarizer 100 further comprises an upper protective layer 13 and a lower protective layer 14. The upper protective layer 13, the ¼ wave plate 11, the first linear polarization plate 12 and the lower protective layer 14 stack up in sequence. A side of the upper protective layer 12 close to the ¼ wave plate 11 is configured with a boss 17 abutting with the first hump 111, the second hump 112 and the third hump 113. By configuring the boss 17 abutting with the first hump 111, the second hump 112 and the third hump 113 on the first linear polarization plate 12, the boss 17 and the first hump 111, the second hump 112 and the third hump 113 are complementary in the thickness direction to make the circular polarizer 100 become a flat surface.

Furthermore, the circular polarizer 100 further comprises an adhesive layer 15 and a separation layer 16, and the adhesive layer 15 connects the separation layer 16 and the lower protective layer 14. The separation layer 16 is employed to be adhered on the color filter substrate.

Figure 2:
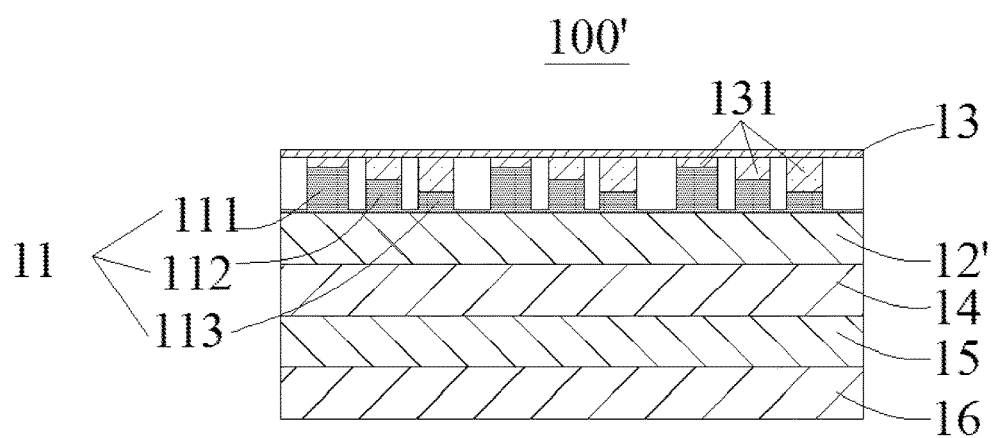
FIG. 2 is another structure diagram of a circular polarizer provided by one embodiment of the present invention.

Please refer to FIG. 2. FIG. 2 is another structure diagram of a circular polarizer provided by one embodiment of the present invention. The difference of this embodiment from the foregoing embodiment is:

In the circular polarizer 100', the upper protective layer 12' is a plane shape, a side of the upper protective layer 13 close to the ¼ wave plate 11 is configured with a boss 131 abutting with the first hump 111, the second hump 112 and the third hump 113.

In this embodiment, by configuring the boss 131 abutting with the first hump 111, the second hump 112 and the third hump 113 on the upper protective layer 13, the boss 1131 and the first hump 111, the second hump 112 and the third hump 113 are complementary in the thickness direction to make the circular polarizer 200 become a roughly flat surface.

Preferably, the upper protective layer 13 is a glass substrate, and the boss 131 and the glass substrate are integrally formed.

Please refer to table 1. Table 1 are values of Δn and d of corresponding λ and the corresponding ¼ wave plate of the red light (R), the green light (G) and the blue light (B) in one specific embodiment of the present invention:

TABLE 1

|   | Δn | λ/nm | d/um |
|---|---|---|---|
| R | 0.0981 | 633 | 1.61 |
| G | 0.1011 | 546 | 1.35 |
| B | 0.1083 | 450 | 1.04 |

The thicknesses d of the first hump, the second hump and the third hump on the ¼ wave plate can be determined according to the material property (i.e. Δn) and the main wavelengths (i.e. λ) of the RGB three colors of the used ¼ wave plate.

It is required to point out that the specific thickness of the circular polarizer proposed in the present invention can be obtained with the relation derivation of Δn, λ and d according to the actual material of the ¼ wave plate, type of the material of the color film substrate and the arrangement condition of the pixel but not limited to the data listed in the foregoing table.

Figure 3:
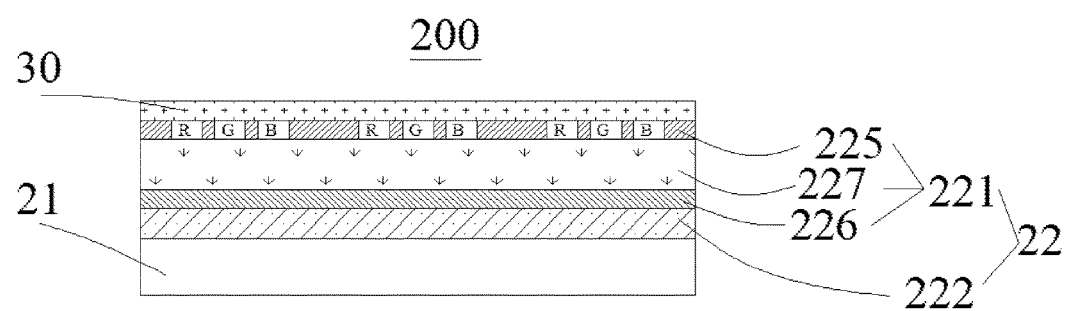
FIG. 3 is a liquid crystal display provided by one embodiment of the present invention.

Please refer to FIG. 3. FIG. 3 is a liquid crystal display provided by one embodiment of the present invention. The liquid crystal display 200 comprises a backlight module 21, a liquid crystal panel 22 and a circular polarizer 30. The circular polarizer 30 can be any circular polarizer of the foregoing embodiments. The backlight module 21 and the liquid crystal panel 22 stack up. The backlight module 21 is employed to provide a light source to the liquid crystal panel 22 for showing images. Specifically, the backlight module 21 can be a direct light type backlight module or a side light type backlight module.

The circular polarizer 30 is adhered to a side of the liquid crystal panel 22 away from the backlight module 21.

Specifically, the liquid crystal panel 22 comprises a liquid crystal cell 221 and a second linear polarization plate 222. The liquid crystal cell 221 comprises a color film substrate 225, an array substrate 226 and a liquid crystal layer 227 sandwiched between the two. The second linear polarization plate 222 is adhered on the array substrate 226 (i.e. the lower surface of the liquid crystal cell 221), and the second linear polarization plate 222 acts the polarization function. The circular polarizer 30 is adhered on the color film substrate 225 (i.e. the lower surface of the liquid crystal cell 221). It can be understood that an included angle of optic axes of the second linear polarization plate 222 and the first linear polarization plate of the circular polarizer 30 is 90 degrees.

Specifically, the separation layer of the circular polarizer 30 is adhered on the color film substrate 225. The color film substrate 225 comprises a plurality of pixels (not shown), and each of the pixels corresponds to a hump region on the circular polarizer 30. Each of the pixels comprises a red sub pixel (R), a green sub pixel (G) and a blue sub pixel (B). The red sub pixel, the green sub pixel and the blue sub pixel respectively correspond to the first hump, the second hump and the third hump on the circular polarizer 30.

After the light source emitted by backlight module in the liquid crystal display of the present invention passes through the liquid crystal panel and the circular polarizer, all the outgoing lights of various colors are circularly polarized lights, which can effectively improve the large view angle color washout of various colors to promote the display result.

The present invention further provides an electronic device. The electronic device utilizes the aforesaid liquid crystal display 200. The electronic device can be the cell phone, the tablet, the television, the display, the notebook, the digital camera, the navigator and any electronic device with display function but not limited thereto.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. A circular polarizer, wherein the circular polarizer comprises a ¼ wave plate and a first linear polarization plate which stack up, and the ¼ wave plate comprises a plurality of hump regions, and each of the hump regions comprises a first hump, a second hump and a third hump which are sequentially aligned, and the first hump, the second hump and the third hump respectively are employed to act to allow red light, green light and blue light penetrating, and a thickness of the first hump is dR, and a thickness of the second hump is dG and a thickness of the third hump is dB, and then dR=λR/4ΔnR, dG=λG/4ΔnG, dB=λB/4ΔnB; wherein λR, λG, λB respectively are wavelengths of the red light, the green light and the blue light, and ΔnR, ΔnG, 4ΔnB respectively are birefringences of the red light, the green light and the blue light in the ¼ wave plate;

wherein the ¼ wave plate is directly positioned on the first linear polarization plate and is covered by an upper protective layer such that the ¼ wave plate is sandwiched between the upper protective layer and the first linear polarization plate; and wherein the upper protective plate has a side adjacent to the ¼ wave plate, the side being integrally formed with a boss that compensates height variation among the first, second, and third humps of the ¼ wave plate so that the boss that is integrally formed with the upper protective plate provides a one-piece structure that covers the ¼ wave plate and compensates the height variation of the ¼ wave plate.

2. The circular polarizer according to claim 1, wherein a lower protective layer is arranged on one side of the ¼ wave plate that is opposite to the first hump, the second hump and the third hump.

3. The circular polarizer according to claim 1, wherein the upper protective layer is a glass substrate, and the boss and the glass substrate are integrally formed.

4. The circular polarizer according to claim 2, wherein an adhesive layer and a separation layer are arranged in sequence on one side of the lower protective layer, which is distant from the ¼ wave plate.

5. A liquid crystal display, wherein the liquid crystal display comprises a backlight module, a liquid crystal panel and a circular polarizer, and the circular polarizer comprises a ¼ wave plate and a first linear polarization plate which stack up, and the ¼ wave plate comprises a plurality of hump regions, and each of the hump regions comprises a first hump, a second hump and a third hump which are sequentially aligned, and the first hump, the second hump and the third hump respectively are employed to act to allow red light, green light and blue light penetrating, and a thickness of the first hump is dR, and a thickness of the second hump is dG and a thickness of the third hump is dB, and then dR=λR/4ΔnR, dG=λG/4ΔnG, dB=λB/4ΔnB; wherein λR, λG, λB respectively are wavelengths of the red light, the green light and the blue light, and ΔnR, ΔnG, 4ΔnB respectively are birefringences of the red light, the green light and the blue light in the ¼ wave plate, and the backlight module and the liquid crystal display panel stack up, and the circular polarizer is adhered at a side of the liquid crystal display panel away from the backlight module, and the liquid crystal display panel comprises a red sub pixel, a green sub pixel and a blue sub pixel, and the red sub pixel, the green sub pixel and the blue sub pixel respectively correspond to the first hump, the second hump and the third hump;

wherein the ¼ wave plate is directly positioned on the first linear polarization plate and is covered by an upper protective layer such that the ¼ wave plate is sandwiched between the upper protective layer and the first linear polarization plate; and wherein the upper protective plate has a side adjacent to the ¼ wave plate, the side being integrally formed with a boss that compensates height variation among the first, second, and third humps of the ¼ wave plate so that the boss that is integrally formed with the upper protective plate provides a one-piece structure that covers the ¼ wave plate and compensates the height variation of the ¼ wave plate.

6. The liquid crystal display according to claim 5, wherein the liquid crystal panel comprises a liquid crystal cell and a second linear polarization plate, and the second linear polarization plate is adhered to a lower surface of the liquid crystal cell, and the circular polarizer is adhered to an upper surface of the liquid crystal cell.

7. The liquid crystal display according to claim 5, wherein an included angle of optic axes of the first linear polarization plate and the second linear polarization plate is 90 degrees.

8. The liquid crystal display according to claim 5, wherein the backlight module is a direct light type backlight module or a side light type backlight module.

9. The liquid crystal display according to claim 5, wherein a lower protective layer is arranged on one side of the ¼ wave plate that is opposite to the first hump, the second hump and the third hump.

10. The liquid crystal display according to claim 5, wherein the upper protective layer is a glass substrate, and the boss and the glass substrate are integrally formed.

11. The liquid crystal display according to claim 9, wherein an adhesive layer and a separation layer are arranged in sequence on one side of the lower protective layer which is distant from the ¼ wave plate.

12. An electronic device, wherein the electronic device comprises a liquid crystal display, and the liquid crystal display comprises a backlight module, a liquid crystal panel and a circular polarizer, and the circular polarizer comprises a ¼ wave plate and a first linear polarization plate which stack up, and the ¼ wave plate comprises a plurality of hump regions, and each of the hump regions comprises a first hump, a second hump and a third hump which are sequentially aligned, and the first hump, the second hump and the third hump respectively are employed to act to allow red light, green light and blue light penetrating, and a thickness of the first hump is dR, and a thickness of the second hump is dG and a thickness of the third hump is dB, and then $dR=\lambda R/4\Delta nR$, $dG=\lambda G/4\Delta nG$, $dB=\lambda B/4\Delta nB$; wherein $\lambda R$, $\lambda G$, $\lambda B$ respectively are wavelengths of the red light, the green light and the blue light, and $\Delta nR$, $\Delta nG$, $4\Delta nB$ respectively are birefringences of the red light, the green light and the blue light in the ¼ wave plate, and the backlight module and the liquid crystal display panel stack up, and the circular polarizer is adhered at a side of the liquid crystal display panel away from the backlight module, and the liquid crystal display panel comprises a red sub pixel, a green sub pixel and a blue sub pixel, and the red sub pixel, the green sub pixel and the blue sub pixel respectively correspond to the first hump, the second hump and the third hump;

wherein the ¼ wave plate is directly positioned on the first linear polarization plate and is covered by an upper protective layer such that the ¼ wave plate is sandwiched between the upper protective layer and the first linear polarization plate; and wherein the upper protective plate has a side adjacent to the ¼ wave plate, the side being integrally formed with a boss that compensates height variation among the first, second, and third humps of the ¼ wave plate so that the boss that is integrally formed with the upper protective plate provides a one-piece structure that covers the ¼ wave plate and compensates the height variation of the ¼ wave plate.

13. The electronic device according to claim 12, wherein the liquid crystal panel comprises a liquid crystal cell and a second linear polarization plate, and the second linear polarization plate is adhered to a lower surface of the liquid crystal cell, and the circular polarizer is adhered to an upper surface of the liquid crystal cell.

14. The electronic device according to claim 12, wherein an included angle of optic axes of the first linear polarization plate and the second linear polarization plate is 90 degrees.

15. The electronic device according to claim 12, wherein the backlight module is a direct light type backlight module or a side light type backlight module.

16. The electronic device according to claim 12, wherein a lower protective layer is arranged on one side of the ¼ wave plate that is opposite to the first hump, the second hump and the third hump.

17. The electronic device according to claim 12, wherein the upper protective layer is a glass substrate, and the boss and the glass substrate are integrally formed.

* * * * *